United States Patent Office 3,091,639
Patented May 28, 1963

---

3,091,639
N,N'-DI(TRIHALOMETHYLTHIO)-N,N'-DIACYL-HYDRAZIDE DERIVATIVES
Johannes T. Hackmann and Pieter Ten Haken, Herne Bay, England, assignors to Shell Oil Company, New York, N.Y., a corporation of Delaware
No Drawing. Filed Dec. 5, 1960, Ser. No. 73,520
Claims priority, application Great Britain Dec. 11, 1959
6 Claims. (Cl. 260—561)

The invention relates to novel hydrazides, to a process for their preparation and to compositions containing them. The invention further relates to a method of protecting organic material liable to fungal and/or bacterial attack which comprises treating said material with the novel compounds or novel compositions of the invention.

The novel compounds of the invention are hydrazine derivatives of the general formula

wherein R and R′ each represent an acyl group of from 1 to 18 carbon atoms which may be substituted or unsubstituted alkyl, alkenyl, alkynyl, cycloalkyl, aryl, aralkyl, or alkaryl acyl groups, and X and Y each represent a trihaomethylthio group —$SCCl_3$, —$ScBr_3$, —$SCI_3$ and —$SCF_3$, or one of X and Y may represent a hydrogen atom. Preferably R and R′ each represent an acyl group and X annd Y each represent the group —$SCCl_3$.

The preferred acyl group is the radical of a monocarboxylic acid which is saturated and unsubstituted containing from 1 to 18 carbon atoms. An especially preferred acyl group is the radical of a monocarboxylic acid which is saturated and unsubstituted containing from 1 to 9 carbon atoms. Most preferably, R and R′ each represent a formyl or acetyl group and X and Y each represent a —$SCCl_3$ group.

Representative acyl groups are the alkyl acyl groups such as, for example, formyl, acetyl, propionyl, caproyl, palmityl, stearyl, arachidyl, and the like; the alkenyl acyl groups such as, for example, acrylyl, crotonyl, isocrotonyl, and the like; the alkynyl acyl groups such as, for example, propiolyl, and the like; the cycloalkyl acyl groups such as, for example, cyclopropanoyl, cyclobutanoyl, hexahydrobenzoyl, cycloheptanoyl, and the like; the aryl acyl groups such as, for example, benzoyl, 1-napthloyl, and the like; the aralkyl acyl groups such as, for example, phenylacetyl, hydrocinnamyl, 1-naphthalene-acetyl, and the like; the alkaryl acyl groups such as, for example, o-toluyl, p-toluyl, and the like. The substituents which the above acyl groups may bear are the simple substituents such as, for example, halo, nitro, hydroxy, alkoxy, and so forth.

The novel compounds of the invention are prepared, according to the invention, by reacting an alkali metal, e.g., sodium, potassium, lithium, salt of the mono- or diacyl hydrazide with a perhalomethyl mercaptan, e.g., perchloromethyl, perbromomethyl, periodomethyl or perfluoromethyl mercaptan.

The symmetrical diacyl hydrazides may be obtained by heating hydrazine with an excess of a lower alkyl ester, e.g., the methyl, ethyl or propyl ester of the appropriate carboxylic acid. The hydrizides prepared in this way can in general be used in the process of the invention without purification. The hydrazides may also be obtained by reactiong hydrazine or the monoacyl hydrazide with an acid anhydride, e.g., acetic anhydride, propionic anhydride, and the like. The monoacyl hydrazides may be prepared by reacting hydrazine, which may be anhydrous or in the form of hydrazine hydrate, with a methyl, ethyl or propyl ester of the carboxylic acid. In general, the reaction occurs spontaneously with evolution of heat, though in some cases it may be necessary to heat the reactants together. Yields of at least 90% of the diacetyl hydrazide can be obtained with a relatively short reaction time by heating equimolar proportions of hydrazine and acetic anhydride. The mono- and diacyl hydrazides may also be obtained by adding a well-cooled solution of the acid halide, preferably the acid chloride, e.g., acetic chloride, propionic chloride, in a suitable solvent, for example, ether, to a well-cooled, stirred solution of hydrazine hydrate in alcohol containing an excess of hydrazine. The resulting solution is extracted with water to remove hydrazine hydrohalide and the ethereal solution dried and the solvent removed by distillation.

The diacyl hydrazide thus obtained is then reacted in the form of its di-alkali metal salt, preferably the sodium salt, with a perhalomethylmercaptan, preferably perchloromethyl mercaptan, and preferably with two equivalents thereof. The reaction may be effected by reacting the solid hydrazide with the perhalomethyl mercaptan but is preferably effected in an aqueous or alcoholic or aqueous alcoholic medium. The reaction is suitably carried out by dissolving the diacyl hydrazide in the appropriate amount of aqueous alkali metal hydroxide solution, preferably sodium hydroxide solution, preferably at a temperature below 5° C., then slowly adding the perhalomethyl mercaptan to the solution while it is at this temperature. When the solution becomes neutral or acidic, the solid product is filtered off, washed with water and dried. It may be recrystallized, for example, from light petroleum.

The following examples illustrate the novel compounds of the invention and their preparation, parts by weight (w.) and parts by volume (v.) bearing the same relation as the kilogram and the liter. It is to be understood, however, that the examples are merely illustrative and are not to be regarded as limiting since the basic teachings herein may be varied as will be understood by one skilled in the art to which this invention pertains.

EXAMPLE I

*Preparation of N,N′-Diformyl-N,N′-Bis(Trichloromethyl Mercapto)Hydrazide*

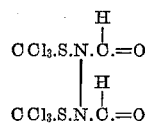

Sodium formate (68 w.; 1 mol.) and hydrazine sulfate (65 w.; 0.5 mol.) were heated together at 100° C. for 20 hours. Alcohol (1000 v.) was added to the resultant product and the mixture filtered. The alcohol was evaporated from the filtrate to give a residue of diformyl hydrazide.

Diformyl hydrazide (88 w.; 1 mol.) was dissolved in a solution containing sodium hydroxide (80 w.; 2 mol.) in water (3000 v.) at a temperature below 5° C. The solution was stirred and cooled in ice during the addition of perchloromethyl mercaptan (372 w.; 2 mol.) until the solution showed an acid reaction to litmus indicator. This took about two hours. The product was filtered off, washed with water and dried. Yield 135 w.

Recrystallization of the product from 80 to 100° C. light petroleum gave a colorless crystalline product, M.P. 106 to 108° C. Found: C, 12.1; H, 0.71%; theory: $C_4H_2O_2N_2S_2Cl_6$ required C, 12.4; H, 0.51%.

EXAMPLE II

*Preparation of N,N′-Diacetyl-N,N′-Bis(Trichloromethyl Mercapto)Hydrazide*

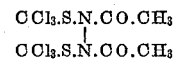

Diacetyl hydrazide (116 w.; 1 mol.) was dissolved in a solution of sodium hydroxide (80 w.; 2 mol.) in water (3000 v.) at a temperature between 0° and 4° C. The solution was stirred and cooled in ice while perchloromethyl mercaptan (372 w.; 2 mol.) was added and until the solution showed an acid reaction to litmus indicator. This took about two hours. The solid product was filtered off, washed with water and dried. Yield of crude product 103 w. Crystallization from petroleum ether gave a colorless crystalline product, M.P. 96–98° C.

In a similar manner were prepared:

N,N'-di(trichloromethylmercapto)-N,N'-dipropionyl hydrazide;
N,N'-di(trichloromethylmercapto)-N,N'-dilauroyl hydrazide; and
N,N'-di(trichloromethylmercapto)-N,N'-dibenzoyl hydrazide.

In a similar manner may be prepared:
N,N'-di(tribromomethylmercapto)-N,N'-dibutyryl hydrazide;
N,N'-di(triiodomethylmercapto)-N,N'-diiosbutyryl hydrazide;
N,N'-di(trifluoromethylmercapto)-N,N'-dicrotonyl hydrazide;
N,N'-di(trichloromethylmercapto)-N,N'-dipalmityl hydrazide;
N,N'-di(tribromomethylmercapto)-N,N'-distearyl hydrazide;
N,N'-di(triiodomethylmercapto)-N,N'-diarachidyl hydrazide;
N,N'-di(trichloromethylmercapto)-N,N'-diarachidyl hydrazide
N,N'-di(trichloromethylmercapto)-N,N'-disorbyl hydrazide;
N,N'-di(tribromomethylmercapto)-N,N'-dierucyl hydrazide;
N,N'-di(triiodomethylmercapto)-N,N'-dihexahydrobenzoylhydrazide;
N,N'-di(trichloromethylmercapto)N,N'-di-1-naphthoyl hydrazide;
N,N'-di(trichloromethylmercapto)-N,N'-di-o-toluyl hydrazide;
N,N'-di(trichloromethylmercapto)-N,N'-diphenylacetyl hydrazide;
N,N'-di(trichloromethylmercapto)-N,N'-dihydrocinnamyl hydrazide;
N,N'-di(trichloromethylmercapto)-N,N'-di-1-naphthaleneacetyl hydrazide.

The compounds of the invention possess not only high bactericidal and fungicidal activity but also a wide spectrum of activity in these fields. The diformyl and diacetyl derivatives of Examples I and II are active both in solution and in vapor phase. At a concentration of 12 parts per million (p.p.m.) in 0.8% peptone broth, each gave a 100% kill of *Bacillus subtilis* and *Pseudomonas putrefaciens*. N,N'-diformyl-N,N'-bis(trichloromethyl mercapto) hydrazide at 100 p.p.m. was active against *Vibrio chloerae* in in vitro tests. Hyphal growth of *Aspergillus niger* and *Penicillium roqueforti* growing on 2% malt agar was completely inhibited when a paper assay disc of one centimeter diameter which had been impregnated with 0.1 ml. of a 0.5% solution containing, at the lowest concentration tested, 10 p.p.m. (based on weight of the paper disc) of either the diformyl or the diacetyl derivative, was placed on the agar.

The compounds of the invention are highly active against pathogenic fungi attacking plants. Thus, the diformyl and diacetyl derivatives of Examples I and II proved to be four times as effective as the standard fungicides zinc ethylene bisdithiocarbamate or ethylene bisthiuram disulfide, applied as aqueous dispersions, in protecting tomato plants against infection by *Phytophthora infestans* in the absence of rain and even when the plants were subjected to artificial rain equivalent to 60 mm. of rain between spraying of the plants with the chemical and inoculation with spores of the fungus, these two compounds still proved superior to the above standard fungicides. The tenacity of the spray residues was determined in artificial rain tests on tomato plants growing in a greenhouse. The chemicals were used in the form of aqueous suspensions prepared in a micro wet grinder. The suspensions contained 0.005 ml. of Triton X100 per 100 ml. The suspensions were sprayed on the tomato plants to run off. After spraying and prior to inoculation with swarm spores of *Phytophthora infestans* the plants were exposed to 60 mm. of artificial rain. For comparative purposes, similar tests were carried out with the standard fungicides available under the registered trademarks Zineb (zinc ethylene bisdithiocarbamate) and Captan (N-trichloromethylthiotetrahydrophthalimide) and with plants not treated with a fungicide. The results are shown in the following table.

| Fungicide | Percent Concentration of Active Material in Spray | Infection of *P. infestans* on 12 Leaves (3 Leaves from Each of 4 Plants) | |
|---|---|---|---|
| | | No Rain | 60 mm. Rain |
| Product of Example I | 0.01 | 5 | 63 |
| Product of Example II | 0.01 | 5 | 55 |
| Zineb | 0.01 | 28 | 85 |
| Captan | 0.05 | 14 | 75 |
| Control (unsprayed) | | 120 | 120 |

These test results show that both hydrazides have an inherent tenacity of the same order as that of the standard fungicides Zineb and Captan.

The diformyl and diacetyl derivatives also proved superior to the standard fungicides Captan and manganese ethylene bisdithiocarbamate in protecting celery plants from infection by *Septoria apiigraveolentis*. The diacetyl derivative had an activity approaching one-half to one-third of the fungicidal activity of the standard fungicide Karathane in protecting cucumber plants and apple trees against powdery mildew. The diformyl derivative showed about one-tenth of the activity of Karathane in this test. Against *Uromyses fabae* on broad beans, the above diformyl and diacetyl derivatives are somewhat less active than Zineb but considerably more active than Captan.

The compounds of the invention are also useful as seed dressings to eradicate seed-borne fungus spores, e.g., *Phoma betae*, and to protect germinating seeds against soil-borne fungi. Thus, applied as a 20% by weight dust to pea seeds at the rate of 3 grams per kilogram of seed, the diformyl and diacetyl derivatives were as effective as the standard fungicide tetramethylthiuram disulfide applied as a 50% by weight dust at the rate of 3 grams per kilogram of seed. It is advantageous to incorporate dimethyl formamide in these seed dressings since this compound not only acts as a solvent for the hydrazide derivative but also has a beneficial effect on the germination of the treated seeds.

The above formyl and diacetyl derivatives were applied to *Phoma* infested beet seeds as a 5% solution in dimethyl formamide at a dose rate of 40 ml. of the solution to a kilogram of seed, equivalent to 2 grams of active material per kilogram of seed. A similar degree of control was obtained as with methyl mercury dicyandiamide, the active ingredient of the standard seed dressing Panogen, applied at 0.07 gram per kilogram of seed.

The compounds of the invention have the further advantage that they are not phytotoxic to plants when applied as an aqueous dispersion of 0.3% by weight concentration. The concentration is considerably higher than the concentration required to control fungus diseases of plants so that there is a considerable safety margin. The compounds also have satisfactory light stability.

For use, the novel compounds of the invention may be formulated with one or more substances selected from the group consisting of solid carriers, liquid carriers and surface active agents. Depending on the concentration of active ingredient, these compositions may be suitable for application as such or may be concentrates which are diluted for application, for example, with relatively large volumes of finely divided solid carriers where a dust is required, or with water where an aqueous spray is required. In concentrates, the active ingredient may be present in a concentration of from 10 to 95% by weight. Effective control of fungus diseases of plants is obtained by application at rates of 1 to 2.5 pounds per acre.

Compositions of the invention which are dust concentrates or dusts for application comprise the novel compounds of the invention in finely divided form mixed with a finely powdered solid carrier such as is commonly used in manufacturing pesticidal dusts for agricultural and horticultural use, for example, finely powdered clay, talc, silica, fuller's earth or kieselguhr. These powder carriers may be oil treated to improve adhesivity to the plant surface.

Compositions of the invention may also be wettable powders. These may contain a major porportion of a novel compound of the invention, for example, at least 80% by weight, and a minor proportion of a suspending agent or of a wetting agent and a suspending agent. Wettable powders may also comprise at least 10% by weight of a novel compound mixed with a finely divided solid carrier as indicated above and a suspending agent or a suspending agent and wetting agent. Examples of suspending agents which may be used are the sodium or calcium salts of lignin sulfonic acids obtained as by-products in the sulfite process of wood pulp manufacture and condensed arylsulfonic acids such as are available under the trade names Tamol, Intraphore and Leukanol. Other additives may be present, for example, water conditioning agents such as sodium phosphate or sodium polyphosphates, or cellulose ethers such as methyl cellulose or the sodium salt of cellulose glycollic acid. These compositions are diluted with water for application.

Liquid compositions of the invention may comprise a solution or a dispersion of a novel compound of the invention in an organic liquid which may be applied either as such or after dilution. For application to plants, the organic liquid used should not be phytotoxic. Particularly suitable organic liquids which may be used are petroleum spray oils boiling in the range 275° to 575° F. or boiling in the range 575° to 1000° F. and having an unsulfonatable residue of at least 75% and preferably of at least 90%, or a mixture of these two types of oil.

Emulsifiable concentrates are another type of composition which may be used. These comprise a concentrated dispersion of the novel compounds in a water-insoluble organic liquid, for example, a petroleum spray oil as indicated above containing an added wetting or emulsifying agent. A minor proportion of water, for example, 5 to 10% by volume, based on the total composition, may be incorporated to facilitate subsequent dilution with water. These concentrates are diluted with water for application by low or high volume spraying.

For industrial use, for example, in inhibiting fungal and bacterial growth in the manufacture of such materials as paper, leather, textiles, felt and glue, aqueous cutting oil compositions used in metal working, the compounds of the invention may be added to the aqueous processing liquor in solid form or, preferably, as a solution in a water-soluble organic solvent, for example, an alcohol such as methyl, ethyl or isopropyl alcohol, or a ketone such as acetone or methyl ethyl ketone. Advantageously, such solutions may also contain an emulsifier to facilitate dispersion of the solution in the aqueous processing liquor. An improved process for the manufacture of materials involving treatment in aqueous media, such as are indicated above, which comprises incorporating in said media a novel hydrazide as specified above or a composition containing said hydrazide and a liquid carrier or a surface active agent, is a further feature of the invention.

The novel compounds may be used in conjunction with one or more other pesticidal compounds such as fungicides, bactericides, insecticides and antibiotics.

Organic material which is liable to deterioration by fungal and/or bacterial attack, for example, cotton and linen goods, leather, paper, wood, glue and size, may also be protected from such deterioration, according to a further feature of the invention, by incorporating a novel compound or composition of the invention in the material. The organic material so protected is included in the scope of the invention.

We claim as our invention:
1. N,N'-di(trihalomethylthio)-symmetrical N,N'-diacyl hydrazide of a saturated unsubstituted monocarboxylic acid of from 1 to 9 carbon atoms.
2. N,N'-di(trichloromethylthio)-symmetrical N,N'-diacyl hydrazide of a saturated unsubstituted monocarboxylic acid of from 1 to 9 carbon atoms.
3. N,N' - di(trichloromethylthio)-N,N'-diformylhydrazide

$$CCl_3.S.N.CHO$$
$$|$$
$$CCl_3.S.N.CHO$$

4. N,N' - di(trichloromethylthio)-N,N'-diacetylhydrazide $$CCl_3S.N.CO.CH_3$$
$$|$$
$$CCl_3S.N.CO.CH_3$$

5. N,N' - di(trihalomethylthio) - N,N'-diformylhydrazide.
6. N,N'-di(trihalomethylthio)-N,N'-diacetylhydrazide.

References Cited in the file of this patent
UNITED STATES PATENTS
2,762,740    Margot et al. _____ Sept. 11, 1956